United States Patent [19]

Westby

[11] 3,976,382

[45] Aug. 24, 1976

[54] PROCEDURE AND APPARATUS FOR DETERMINING THE GEOMETRICAL SHAPE OF A SURFACE

[75] Inventor: Ola Westby, Nordosletta, Norway

[73] Assignee: A/S Kongsberg Vapenfabrik, Norway

[22] Filed: Nov. 12, 1973

[21] Appl. No.: 415,455

[30] Foreign Application Priority Data
Nov. 14, 1972   Norway................................ 4112/72
Oct. 19, 1973   Norway................................ 4060/73

[52] U.S. Cl. .............................. 356/120; 356/156; 356/167; 356/159; 356/237; 356/239
[51] Int. Cl.² ....................................... G01B 11/30
[58] Field of Search ...................... 219/124, 125 PL; 356/120, 167, 237, 239, 156, 167, 159; 250/263

[56] References Cited
UNITED STATES PATENTS

| | | | |
|---|---|---|---|
| 2,446,628 | 8/1948 | Brown............................. | 356/356 X |
| 3,091,699 | 5/1963 | Hammar.......................... | 250/563 |
| 3,135,857 | 6/1964 | Von Voros...................... | 219/125 PL |
| 3,176,306 | 3/1965 | Burns.............................. | 356/237 X |
| 3,187,185 | 6/1965 | Milnes............................ | 356/156 X |
| 3,309,958 | 3/1967 | Simon............................. | 356/167 |
| 3,387,139 | 6/1968 | Gerard............................ | 356/167 X |
| 3,592,548 | 7/1971 | Majkowski...................... | 356/167 |
| 3,614,237 | 10/1971 | Kyle et al....................... | 356/156 |
| 3,702,737 | 11/1972 | Mottier........................... | 356/237 |
| 3,762,818 | 10/1973 | Johnson et al................. | 356/156 |
| 3,776,640 | 12/1973 | Ikegami.......................... | 356/156 |
| 3,814,521 | 6/1974 | Free................................ | 356/156 |
| 3,858,981 | 1/1975 | Jaerisch et al................. | 356/159 |

*Primary Examiner*—Saxfield Chatmon, Jr.
*Attorney, Agent, or Firm*—Watson, Cole, Grindle & Watson

[57] ABSTRACT

A procedure and an apparatus for obtaining information regarding the geometry of surfaces, for example on work pieces in mechanical industry.

The procedure is based on casting a shadow on the surface by partially shielding incident light or other types of radiation. The edge of the shadow thus cast on the work piece, if viewed from a direction substantially different from that defined by the radiation source and the edge of the shield, will provide a profile of shield, will surface. Moving the shadow across the work piece will provide a continuous series of such profiles, if the edge of the shadow may be seen at all times.

The apparatus may include photo-electric converters, like a TV camera, for registering the shape of the shadow by means of a display screen, and for providing signals which may be processed by a computer. The computer output signals, being indicative of the size and the location of special features of interest, for example a joint to be welded, may be used for automatic control of machine shop processes, like turning, welding, measurement and inspection.

19 Claims, 7 Drawing Figures

PROCEDURE AND APPARATUS FOR DETERMINING THE GEOMETRICAL SHAPE OF A SURFACE

BACKGROUND OF THE INVENTION

The present invention concerns a procedure and an apparatus for determining the geometrical shape of a surface, in particular on work pieces to be machined, welded, measured, or inspected.

In mechanical industry, apparatus of various kinds are in use for measuring the surface geometry of work pieces. Such apparatus usually serve for inspection of finished pieces, or for process control purposes, as for example automatic machining by means of so-called adaptive control. In welding technology such surface indications are useful for automatic guidance of the welding head along the joint (joint tracking), for controlling the operating parameters (for example current, voltage, speed etc.) of the welding equipment during so-called process control, and for inspecting the finished weld with regard to appearance and quality.

For some industrial applications photoelectric equipment is available, which usually comprises a TV-camera, and which is employed in such manner that the location of lines of contrast (transitions between light and shadow) in the TV picture may be registered by means of indicator instruments, ink recorders, or computers. This implies for example the possibility of measuring certain dimensions and positions of dark regions in a TV picture, which otherwise is bright. This principle based upon photoelectric surveillance of illuminated surfaces is employed in mechanical industry in various ways, for example:

a. By turning in a lathe, a TV camera is focussed on the work piece which is seen against a bright background, giving an outline of the work piece. Feeding of the cutting tool in the lathe is done on the basis of electric output signals from the TV camera, which represents the contrast outline.

b. In Soviet technical literature, equipment for automatic joint tracking during welding has been described, which employs a light source placed behind the open joint and a TV camera in front focussed on the bright slit. The contrast lines in the TV picture are in that case the edges of the bright slit. The welding head is tracked automatically along the slit displayed, which means along the joint to be welded.

c. U.S. Pat. No. 3,532,807 also shows guidance of a welding head along a joint to be welded. In this case, one edge of the joint is processed in advance, to reflect incident light into a TV camera, which thus will register a bright line along the joint, that is parallel to the motion of the center line of the welding head.

The major disadvantages of the known devices of this kind are that they do not in many important practical cases supply sufficient information with regard to the shape of the surface. It is limited to the location of particular lines which form natural borders between physically separate areas, for example the border between bright and dull surfaces (point c. above) or the outlines of a work piece against a background (a. and b. above). These known devices do not supply any information, however, with regard to the shape of the surface, on such parts of the piece which do not contain a definite edge as a natural line of contrast. For example, such devices do not supply any information with regard to the cross section of the joint to be welded, as seen in a direction normal to the direction of the weld.

In many cases the devices just described are also unpractical. They require either surface preparation (c:) or access to the region behind the work piece (a. and b.)

SUMMARY OF THE INVENTION

One purpose of the present invention is therefore to provide a procedure of this general type for determination of the surface geometry, which does not suffer from those discrepancies and disadvantages discussed above. This procedure employs electromagnetic radiation incident upon the surface from a radiation source. The special feature according to the invention comprises partial interception of the incident radiation by means of at least one radiation shield, thus providing a shadow outline of great contrast between irradiated and shielded areas on the surface, by way of placing the illuminated edge of the radiation shield closer to the surface than to the radiation source.

In principle one may employ electromagnetic radiation of any kind, for example radio waves, infrared or ultraviolet radiation, X-rays or gamma rays, but for most practical purposes visible light is preferable.

Radiation detectors, for example photoelectric converters, are preferably employed for said indication of the geometrical shape of the surface, by way of the incident radiation and that part received by the radiation detectors, preferably forming substantially different angles with the normal to the surface along the sharp contour.

An important feature of the procedure according to the invention is the placement of the radiation screen close to the work piece, while the radiation source is located relatively far away. This provides a sharp transition between irradiated and screened areas on the work piece, and provides great precision of measurement. With regard to welding, the requirements on tolerances are in the region of 0.1 to 0.5 mm, which is entirely within the capability of the present procedure. The shadow outline will in fact be so sharp that the precision of the procedure will be limited by the photoelectric converters.

The relationship between the incident radiation, usually provided by a light source and the light whch is detected, that is their different angles with the direction normal to the surface in the region of interest, provides an important advantage also, namely the elimination of undesirable reflections. In case the reflective properties of the surface are uneven, reflections may normally occur which will disturb the photoelectric conversion. This may occur on work pieces containing ground areas, milled grooves for welding, bright welds, painted text, and so on. Unwanted reflections will very often occur with radiation screens placed far away from the object, and in particular if the photoelectric converters are placed so that the angles of the incident and the reflected light at the surface are about equal.

According to the procedure of the present invention the photoelectric converters may also be used for scanning the shadow image or its display, and for the generation of analogue or digital signals which express the position of the contour by passage of the scan across the sharply delineated contour.

The electric signals thus generated may be processed by a computer for use in controlling machining, welding, measuring, or inspecting processes.

Furthermore, in certain cases parts of the object surface itself may be used as a radiation shield.

It is also a purpose of the invention to provide an apparatus for implementing the above procedure according to the invention, equipped with a radiation source which provides radiation incident on the surface.

On this basis a special feature of the apparatus according to the invention includes the provision of at least one radiation shield for creation of a shadow image having sharply delimited contour between irradiated and shielded areas on the surface. The edge of the radiation shield which provides the contour is placed closer to the surface than to the radiation shield, and the shadow image, or its display on a screen by means of a projector arrangement, is used to indicate the geometrical shape.

The apparatus according to the invention is preferably designed to comprise radiation detectors, for example a TV camera, for the indication of the geometry of the surface, with the detectors directed at an angle which substantially differs from the angle of the incident radiation, with respect to the normal direction to the surface along the sharply delineated contour.

This special feature, that the apparatus according to the invention is equipped with a radiation shield of special shape for mounting close to the surface of the object under investigation, provides among other things the advantage that the apparatus easily may be adapted to special tasks by providing a contour edge on the radiation shield to fit the task. In most cases this is achieved by shaping the edge in gross correspondence with the object surface. One easily realizes that such devices provide substantial advantages if the surface to be investigated is complicated, for example for welding inside corners between steel plates. Surface measurements of this type employing known devices would require complicated power steering of light spots according to a definite pattern.

Furthermore, the apparatus according to this invention may be used even if the work piece has a shape so complicated that the surface is not immediately accessible to an operator, for example inside welded containers or narrow passageways. In this case the advantage of this shadow image apparatus stems from its relative compactness and ease of handling, and its ability to provide a visual image of the object. The apparatus may be used in a vacuum chamber, which is increasingly relevant for welding, and it will work in all positions, like horizontally, vertically and upside-down.

BRIEF DESCRIPTION OF THE DRAWINGS

The invention will be described in more detail by means of some examples of its embodiments, and by reference to the enclosed drawings, wherein.

DESCRIPTION OF THE PREFERRED EMBODIMENTS

Figures 1, 2:
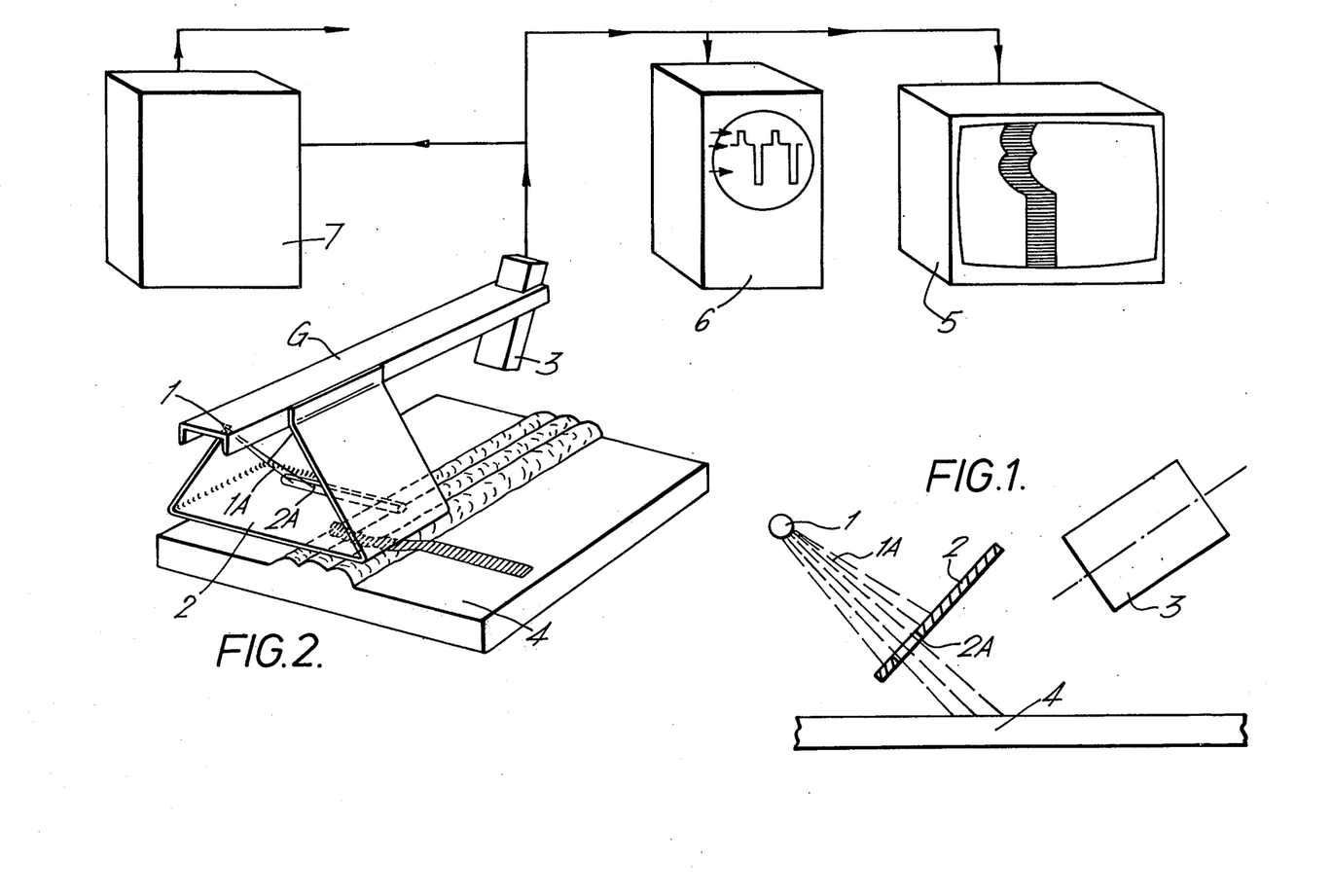
FIG. 1 shows the principle of an apparatus according to the invention.
FIG. 2 shows an embodiment of the apparatus of the invention applied to an investigation of irregularities on an otherwise planar surface.

FIG. 1 shows in a schematic fashion that the apparatus according to the invention in principle consists of a light source 1 which provides light incident on an object 4, whose surface shall be investigated. A light shield 2 is placed between the light source 1 and the object 4, and closest to the object, for generation of a shadow image having sharply delineated contour between illuminated and shielded areas on the surface of the object. A device for photoelectric conversion, preferably a TV camera 3, is directed at this shadow image on the surface. The shadow image may be static, or may be caused to move along the surface of the object by motion of the light source and/or the shield with respect to the object 4. By relative motion between the object 4 and one or more of the components 1,2 or 3 of the apparatus, one may obtain TV images which over a period of time will provide a complete description of the surface in three dimensions.

FIG. 2 shows an example of an embodiment of the shadow image apparatus according to the invention. In order that the contour of the shadow image on the object 4 be sharp, the light 1 is approximately a point source, while the radiation shield 2 is placed at a considerable distance from the source, but in close proximity to the surface on the object 4 to be investigated. The radiation shield 2 has a straight slit 2A which is illuminated by incident light 1A from the light source 1. The edge of this slit thus will provide a sharp contour between a bright area surrounded by shadows on the surface of the object 4. This bright area will be a straight band where the surface of the object is planar, but outside the planar regions the band will show the irregularities of the surface. A TV camera 3 is directed at the shadow image for reproducing it on the screen, whereby the camera unit generates video signals which are supplied to signal processing equipment 7 that registers the timing of changes in the video signals. This equipment 7 will then emit an electric output signal which is a direct expression of the shape and the location of the shadow image within the TV picture. The oscilloscope 6 and the TV monitor 5 are not essential parts of the apparatus, but are practical means for monitoring the video signal and the TV picture itself. The light source 1, the radiation shield 2, and the TV camera 3, mounted on the jig G, may be displaced together with regard to the object 4.

Figure 3:
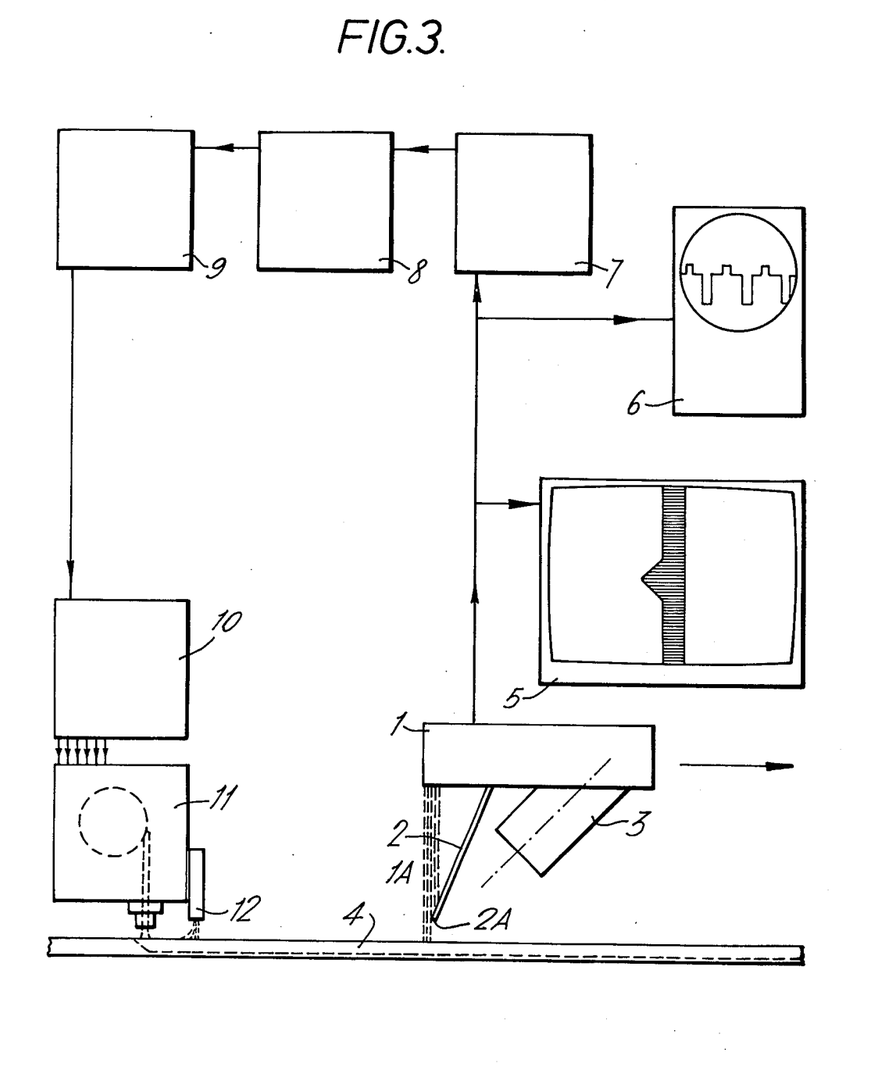
FIG. 3 shows an embodiment of the apparatus of the invention applied to the process control of a welding operation.

In FIG. 3, there is shown an example of the application of the shadow image indicator. The light source 1 is mounted vertically above a straight edge on the radiation shield 2, which allows the TV camera 3 to register a shadow image having a contour depicting the shape of the surface of the object 4 at right angles to the direction of the weld. This is shown by means of the monitor 5 which displays shadow image having a V-shaped contour, corresponding to the joint between the plates 4 to be welded. The wave form of the video signal from the TV camera 3 is shown on the oscilloscope 6. This video signal is converted in the signal processing equipment 7, which over a period of time will be capable of providing a complete three-dimensional description of the shape of the object surface for the computer 8. On the basis of this information regarding the shape and the location of the joint to be welded the computer 8 will guide the automatic welder 11. The interface equipments 9 and 10 have been provided for transmission of signals by cable between the computer 8 and the automatic welder 11. A shield 12 on the welder prevents the welding arc from interfering with the shadow image to be registered by the TV camera. Guiding the shadow image apparatus along the joint, as shown in FIG. 3, will provide a complete description of the surface of the work piece. This assumes rapid and complete recording in the computer 8 of the information presented by the TV camera, which may be achieved by known technical means. By means of the procedure and the apparatus according to the invention, there is thus achieved a registration of the location, the shape and the size of the joint to be welded and of the tack welds present, any displacement or divergence of the plates, the angle between the plates, and the geometry of previous welds, among others. In this manner the present shadow image apparatus may do the work of a large number of specialized commercial indicators, whether they be of mechanical, pneumatic, magnetic or electronic type.

One may state in general that by means of the shadow image indicator, one may register the geometry of the complete surface of the work piece. This may be done rapidly because the TV camera provides a shadow image for the computer every 1/50 of a second.

As described above, and apparent in the TV picture on the monitor 5 in FIG. 3, the shadow image contour provides information about the shape of the joint (V-shape in the picture), its size and its location. On this basis it will thus be possible to control the operating parameters (voltage, current, rate of wire feed, rate of motion, etc.) of the automatic welder, as well as tracking it along the joint. In all circumstances a delay mechanism must be incorporated with the computer program, corresponding to the time elapsed between registering a certain cross section by the shadow image and the arrival of the welder at this spot. For this reason one may run the TV camera along the entire joint in advance and store the information for subsequent guidance of the welder.

In case guidance of the shadow image apparatus itself for tracking of the joint would be desirable, a small notch in the edge 2A on the radiation shield 2 would provide the means. This notch may be V-shaped which on the monitor 5 in FIG. 3 would show up as a notch in the right edge of the illuminated region. Guidance may then be carried out by the computer (or by an operator) which places the shadow image apparatus to achieve alignment between the two V-shaped tracks in the picture.

Figure 4:
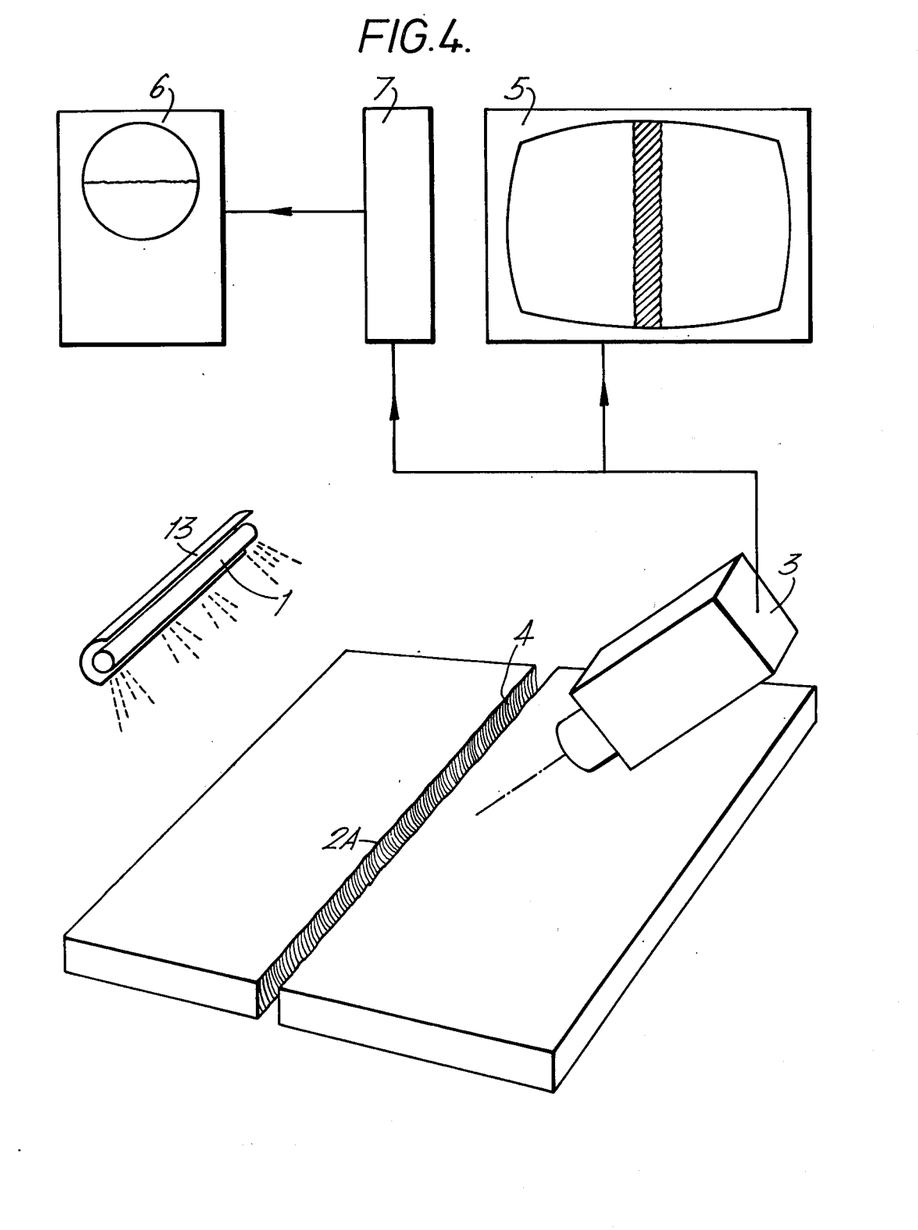
FIG. 4 shows an application of the apparatus of the invention with part of the object surface providing the radiation shield.

FIG. 4 shows an example of the application of the shadow image apparatus when part of the work piece 4 itself serves as radiation shield. The light source 1, in this case a halogen tube in a reflector 13, runs parallel to the joint, which is I-shaped, so that incident light is intercepted by the edge 2A of the joint, leaving one side of the joint itself in the dark. The TV camera 3 is pointed at this dark area and will present a shadow image, shown on monitor 5. This picture is most suitable for joint tracking, that is guidance of a welding head along the joint. The width of the dark band on the TV screen is a measure of the gap in the joint, which means that it may also be employed for process control.

The signal from the TV camera 3 may be converted by the signal processing equipment 7, which registers the timing of the white to black changeover (and vice versa), whereby the output signal from 7 will be a voltage defining the location of the joint. The figure shows this feature by the horizontal line on the oscilloscope 6 corresponding to the left vertical shadow contour on the monitor 5.

Otherwise, the equipment shown in FIG. 4 may be employed in the same manner as shown in FIG. 3, in conjunction with an automatic welder or with a semi-automatic one mounted on a jig.

Figure 5:
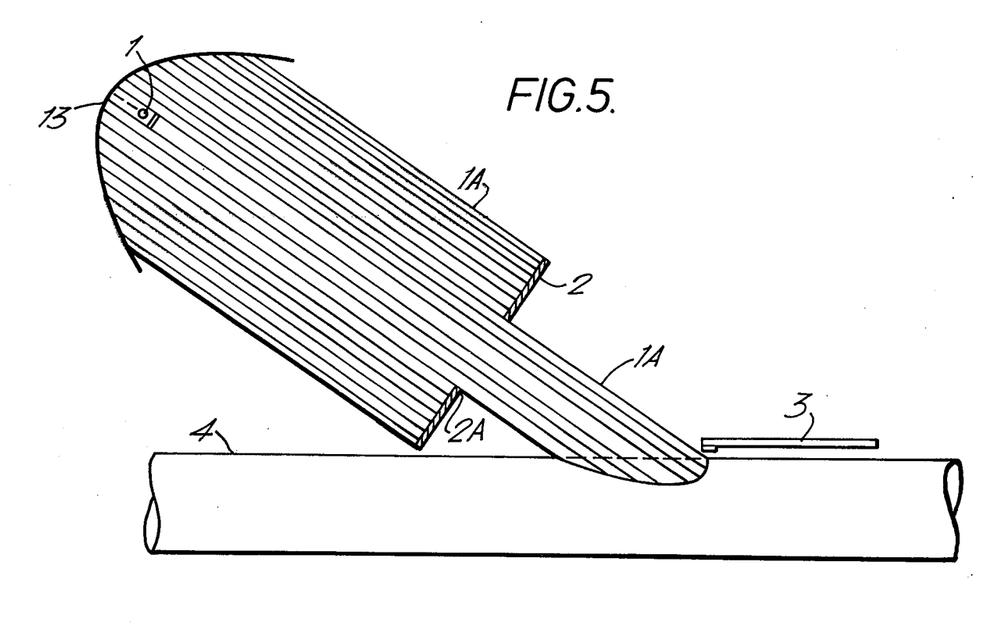
FIG. 5 shows the readout of the contour of the shadow image by means of a line tracker.

In FIG. 5 a radiation source 1 is combined with a reflector 13 for illuminating object 4 with parallel incident light 1A. A circular hole is provided in the radiation shield 2 interposed between the radiation source and the object, the radiation incident on the object 4 thus being a cylindrical beam. The object 4 in this case also being a cylinder, the contour of the shadow image will be the intersection of two cylinders. Placing the edge 2A as close to the surface of the object 4 as feasible, one will achieve a sharply delineated contour between irradiated and shielded areas on the surface.

This sharp contour on the surface of the object may easily be tracked directly by an automatic or a manual line tracker 3, whereby the shape of said contour may be displayed by means of digital or analogue signals from the line tracker.

Figure 6:
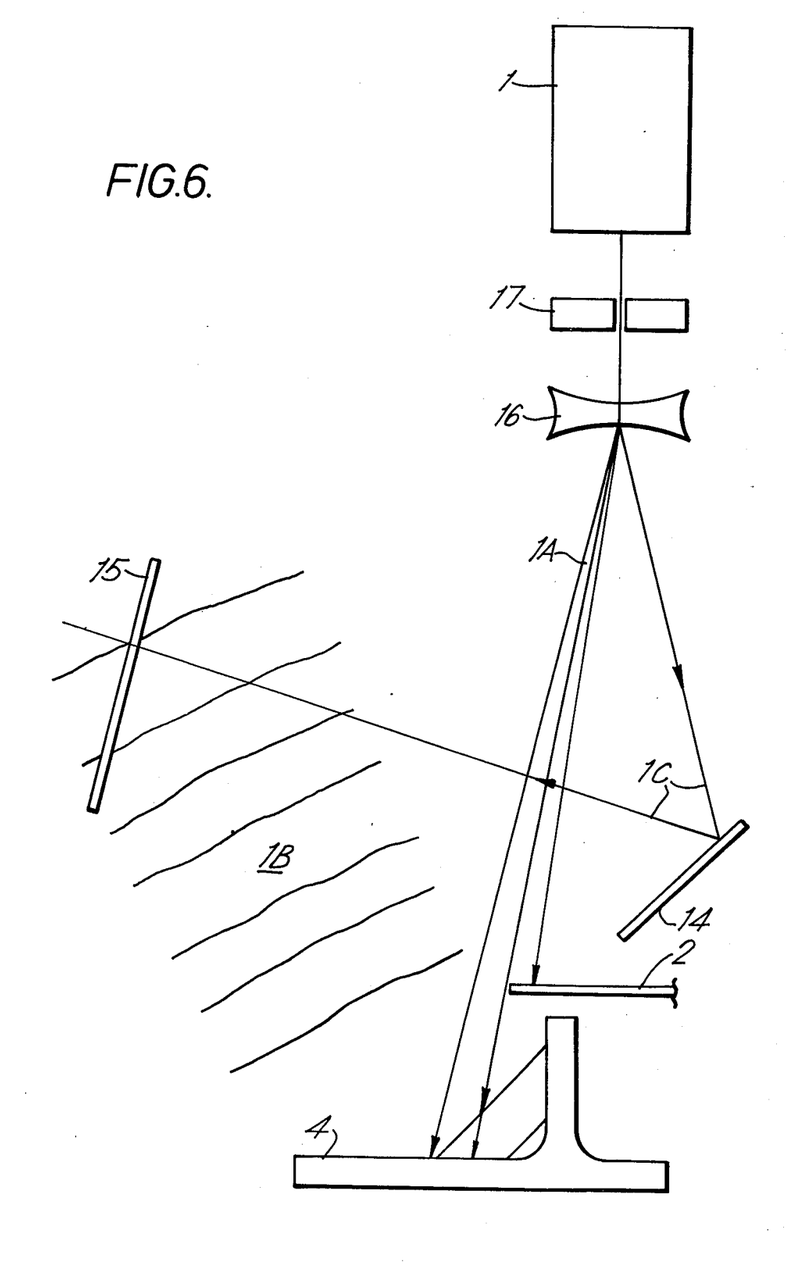
FIG. 6 shows, in principle, how a shadow image generated by coherent radiation may be employed to produce holograms.

FIG. 6 shows how a shadow image according to the invention may be employed for generation of a hologram. Coherent radiation is projected from a laser 1 through the hole in a screen 17 and through a lens 16. Part of the radiation is reflected from a mirror 14 towards a photographic film 15, while the rest reaches the object 4 to be investigated, except that which is intercepted by a movable screen 2, whose shadow thus appears on 4. By interference between scattered radiation 1B from the surface of the object 4 and that from the mirror 14, the film 15 will record a three-dimensional holographic image.

Figure 7:
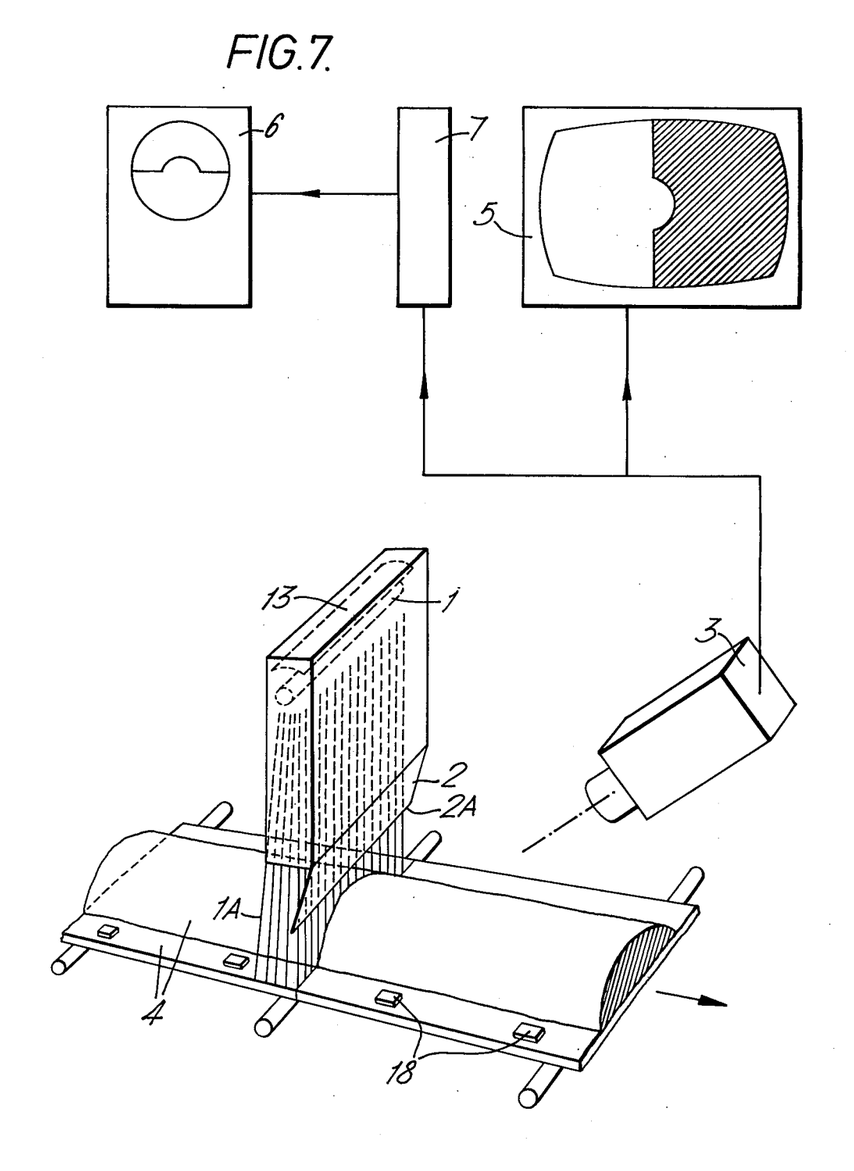
FIG. 7 shows a shadow image apparatus according to the invention as applied to measurement of the amount of material transported on a conveyor belt, and of the velocity of the belt.

FIG. 7 shows an application of the shadow image apparatus of the invention, for measurement of the amount of material transported on a conveyor belt 4, and the speed of the belt. A radiation source 1 equipped with a reflector 13 is mounted across the conveyor belt. The shield 2 thus provides a shadow image across the belt 4, whereby the edge 2A of the shield, in close proximity to the material on the belt, determines the sharpness of the contour and its location. A radiation camera 3, for example a TV camera, directed at the shadow image at an angle substantially different from the angle of the radiation incident on 4, will provide a picture as shown on monitor 5. The shadow image contour in this picture thus expresses the shape of the surface, which in similar manner may also be registered by the oscilloscope 6 upon processing of the video signal by unit 7.

The shape of the surface of the material 4 on the conveyor belt is thus contained in the electric output signal from unit 7. Combined with information regarding belt speed this signal may be used to deduce the shape and the volume of the material conveyed on the belt, preferably by means of computer circuitry or other electronic means. The speed of the belt may be measured directly by means of the shadow image of the markers 18 placed at regular intervals along the edge of the belt 4.

In case the material on the belt has a complex shape, the use of several radiation sources may be required, for example for illumination from the side of the belt. The need for more radiation shields and several cameras may also arise.

I claim:

1. Procedure for determination of the geometrical shape of a surface, in particular of an object to be machined, welded, measured or inspected, said procedure comprising the steps of:
   a. flood irradiating said surface by electromagnetic radiation from at least one radiation source;
   b. partly intercepting said radiation by means of a radiation shield, said shield being opaque to said radiation and having an edge located closer to the surface than to the radiation source, for the generation of a sharp contour line corresponding to said edge between irradiated and shielded regions on said surface;
   c. detecting the form of said contour line along its length as indications of the geometrical shape of said surface along said contour line.

2. Procedure as claimed in claim 1, wherein the electromagnetic radiation consists of visible light from a light source.

3. Procedure as claimed in claim 1, wherein said sharp contour line is extended substantially in a direction transverse to the direction along which a working process is to be performed on said surface.

4. Procedure as claimed in claim 1, wherein the form of said contour line is detected by means of radiation detectors, the incident radiation from the radiation source and the radiation detected by radiation detectors having substantially different angular relationships with the normal to the surface along the sharp contour line.

5. Procedure as claimed in claim 1, wherein the form of said contour line is detected by means of radiation detectors scanning said sharp contour line, and generating output signals indicating the passage of the scan across said sharp contour line.

6. Procedure as claimed in claim 1, wherein the form of said contour line is detected by means of a line tracker mechanically tracking said sharp contour line and generating output signals indicating said form.

7. Procedure as claimed in claim 1, wherein the form of said contour line is detected by the generation of a holographic image of said irradiated and shielded regions surrounding said contour line, through interference between reflected radiation from said regions and direct radiation from said radiation source, providing coherent radiation.

8. Procedure for regulating the operating function of an implement which is moved along a surface to be processed by said implement, said procedure comprising the steps of:
   a. flood irradiating said surface in front of said implement by electromagnetic radiation from at least one radiation source moving at the same rate and in the same direction as said implement;
   b. partly intercepting said radiation be means of a radiation shield moving together with said radiation source, said radiation shield being opaque to said radiation and having an edge located closer to said surface than to said radiation source, in order to generate a sharp contour line corresponding to said edge between irradiated and shielded regions on said surface, said contour line extending in a direction substantially transverse to the direction of motion of said implement;
   c. detecting the form of said contour line along its length as an indication of the geometrical shape of said surface along said contour line;
   d. generating control signals corresponding to the detected form of said contour line; and
   e. automatically regulating the operating functions of said implement in accordance with said control signals.

9. Apparatus for determination of the geometrical shape of a surface, in particular on objects to be machined, welded, measured or inspected, said apparatus comprising:
   a. a source of electromagnetic radiation arranged to flood irradiate said surface;
   b. a radiation shield opaque to radiation from said radiation source and having an edge located closer to the surface than to said radiation source for partly intercepting said radiation and thereby generating a sharp contour line corresponding to said edge between irradiated and shielded regions of said surface; and
   c. detection means for detecting the form of said contour line as an indication of the shape of said surface in the direction of said contour line.

10. Apparatus as claimed in claim 9, wherein said radiation source is a source of visible light.

11. Apparatus as claimed in claim 9, wherein said radiation shield is disposed to generate a sharp contour line which substantially extends in a direction transverse to the direction of motion of processes performed on said surface.

12. Apparatus as claimed in claim 9, wherein said detection means comprise radiation detectors, directed at an angle which is substantially different from the angle of the incident radiation, with respect to the normal to the surface along the sharp contour.

13. Apparatus as claimed in claim 9, wherein said detecting means is operatively adapted to generate output signals indicating the form of said contour line, said signals being processed by signal processing means to provide control signals for selectively automatic controlling of machining, welding, measuring and inspection processes in relation to said surface.

14. Apparatus as claimed in claim 9, wherein said detection means comprise a TV camera operatively disposed for recording the form of said contour line.

15. Apparatus as claimed in claim 9, wherein the radiation source is disposed to emit pulsed radiation.

16. Apparatus as claimed in claim 9, further comprising means for selectively moving said radiation source and said radiation shield for scanning said sharp contour line across said surface.

17. Apparatus as claimed in claim 9, wherein the surface is movably disposed with respect to the sharp contour, the detecting means being arranged to perform current registration of the form of the contour during said movement of the surface.

18. Apparatus as claimed in claim 17, wherein markers are placed on said surfaces, preferably at regular intervals along the direction of motion, the detecting means being arranged to register the passage of each marker across the contour.

19. Apparatus for regulating the operating functions of an implement which is moved along a surface to be processed by said implement, said apparatus comprising:
- a. a source of electromagnetic radiation arranged to flood irradiate said surface in the front of said implement and to be moved at the same rate and in the same direction as the implement;
- b. a radiation shield moving together with the radiation source, said radiation shield being opaque to radiation from said radiation source and having an edge being located closer to the surface than to the radiation source for partly intercepting said radiation and generating a sharp contour line corresponding to said edge between irradiated and shielded regions on said surface, said contour line extending in a direction substantially transverse with respect to the direction of motion of the implement;
- c. detection means for detecting the form of said contour line as an indication of the geometrical shape of said surface in the direction of said contour line;
- d. signal generation means connected with said detection means and operative to generate control signals corresponding to the detected form of said contour line; and
- e. regulation means connected with said signal generating means and operative to regulate the operating functions of said implement in accordance with said control signals.

* * * * *